United States Patent
Schnack et al.

(10) Patent No.: US 7,321,571 B2
(45) Date of Patent: Jan. 22, 2008

(54) IN-BAND WIRELESS COMMUNICATION NETWORK BACKHAUL

(75) Inventors: Larry Schnack, San Diego, CA (US);
Charles Wolfe, San Diego, CA (US);
Darrell Olps, San Diego, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 1207 days.

(21) Appl. No.: 10/256,720

(22) Filed: Sep. 27, 2002

(65) Prior Publication Data

US 2004/0062214 A1 Apr. 1, 2004

(51) Int. Cl.
*H04J 3/08* (2006.01)
*H04B 7/216* (2006.01)

(52) U.S. Cl. .............. 370/320; 370/329; 370/334; 370/341; 370/338; 370/328; 370/315; 455/450; 455/509; 455/561

(58) Field of Classification Search ........ 455/450–453, 455/428, 445, 509, 560, 561; 370/328–330, 370/352, 315, 320, 334–335, 338, 340–342
See application file for complete search history.

(56) References Cited

U.S. PATENT DOCUMENTS

| | | | |
|---|---|---|---|
| 5,970,410 A | 10/1999 | Carney et al. | |
| 6,212,387 B1 * | 4/2001 | McLaughlin et al. | 455/450 |
| 6,317,435 B1 | 11/2001 | Tiedemann, Jr. et al. | |
| 6,327,254 B1 | 12/2001 | Chuah | |
| 6,865,169 B1 * | 3/2003 | Quayle et al. | 370/335 |
| 6,931,257 B2 * | 8/2005 | Shahidi et al. | 455/522 |
| 6,957,042 B2 * | 10/2005 | Williams | 455/452.1 |
| 7,103,017 B2 * | 9/2006 | Gutman et al. | 370/316 |
| 2001/0030956 A1 * | 10/2001 | Chillariga et al. | 370/348 |
| 2003/0190517 A1 * | 10/2003 | Elter et al. | 429/42 |
| 2003/0195017 A1 * | 10/2003 | Chen et al. | 455/562.1 |
| 2004/0203809 A1 * | 10/2004 | Au et al. | 455/450 |
| 2005/0037771 A1 * | 2/2005 | Tiedemann et al. | 455/453 |

* cited by examiner

*Primary Examiner*—George Eng
*Assistant Examiner*—Kamran Afshar
(74) *Attorney, Agent, or Firm*—Coats & Bennett, P.L.L.C.

(57) ABSTRACT

By using allocated spectrum from the mobile station air interface, one or more remote, child access points within a wireless communication network establish backhaul connections to a parent access point having conventional backhaul links to the network. In this manner, backhaul traffic is carried on the standard air interface coexistent with the normal mobile station traffic. Such an arrangement permits parent and child access points to use the standard air interface for both conventional mobile station traffic, as well as backhaul traffic. In an exemplary embodiment, a wireless cellular communication network establishes backhaul connections between one or more child Radio Base Stations (RBSs) and a parent RBS using one or more of the data channels defined by the network's air interface.

63 Claims, 9 Drawing Sheets

IN-BAND WIRELESS COMMUNICATION NETWORK BACKHAUL

BACKGROUND OF THE INVENTION

The present invention generally relates to wireless communication networks, and particularly relates to carrying backhaul traffic on the in-band air interface utilized by such networks.

Wireless communication networks generally include one or more Radio Access Networks (RANs) that provide access to the network. The RAN includes the transceiver resources and associated processing required for supporting radio communication with mobile stations, such as radiotelephones. A typical RAN includes a base station controller and a plurality of radio base stations (RBSs) that serve as access points (APs) for mobile stations. The base stations transmit communication traffic and control data to mobile stations on a forward radio link, and receive communication traffic and control signaling from the mobile stations on a reverse radio link. The frequencies, timing, structure, modulation, and other characteristics of such radio links are governed by the particular "air interface" adopted by the wireless network.

The BSC supervises the operation of the base stations and interfaces the RAN with a core network (CN), which communicatively couples the RAN to the Public Switched Telephone Network (PSTN) and to external Packet Data Networks (PDNs), such as the Internet. The CN may include both circuit-switched and packet-switched communication entities supporting both circuit-switched and packet-switched communication traffic being carried to and from the mobile stations supported by the RAN.

The radio base stations do not use the mobile station air interface for communication with the supporting BSC. Rather, such communication links, generally referred to as "backhaul" links, rely on relatively high bandwidth dedicated communication links, such as T1/E1 lines and/or microwave relay stations. The structure, synchronization, data formats, and signaling protocols differ significantly between the backhaul links and the air interface radio links. Incoming traffic from the core network destined for one or more mobile stations is reformatted for radio transmission according to the requirements of the air interface, and outgoing traffic received from the mobile stations is reformatted for transmission according to the protocol(s) established for the backhaul links.

While dedicated backhaul links provide the bandwidth and reliability needed to carry the aggregate traffic and control signaling passing through the RAN, they impose potentially significant economic and physical barriers to the initial deployment of new wireless networks or the expansion of existing ones. Such barriers arise from, for example, the expense and difficultly of installing land-based backhaul communication links to each of the radio base stations in a RAN. As such radio base stations typically are arranged in a distributed "cellular" pattern, dedicated backhaul links must be installed for each cell.

In poorer countries, such installation may not be practical because of cost constraints, or because the labor and materials necessary for such installation simply are lacking. Even where cost is not the overriding concern, the terrain may be too rugged, or the network operator may need to become operational more quickly than would be practical with land-line construction delays. While microwave links overcome some of the construction difficulties, microwave-based solutions still present technological difficulties, and do nothing to reduce expenses.

Thus, the conventional approach to backhaul interconnection in wireless communication networks can, in some circumstances, unnecessarily delay network deployment and significantly increase the costs of such deployment. Under certain operational conditions, such as where one or more cells in the network are relatively lightly loaded, a different, lower cost backhaul interconnection might be adopted such that deployment costs and complexity are reduced.

BRIEF SUMMARY OF THE INVENTION

The present invention comprises a method and apparatus for carrying backhaul traffic between radio access points in a wireless communication network using a portion of the air interface provided for supporting mobile station communications. In an exemplary embodiment, backhaul traffic, including mobile station and access point control signaling, passes between a "child" access point and a "parent" access point via the air interface on one or more of the air interface's data channels ordinarily used for carrying traffic to or from mobile stations. Such an arrangement permits the deployment of child access points without requiring the installation of conventional backhaul links to the child access points.

In an exemplary embodiment, Radio Base Stations (RBSs) within a cellular network serve as the access points, and a parent RBS sends and receives backhaul traffic for one or more child RBSs using one or more communication channels defined by the network's air interface. Preferably, the parent RBS includes a relatively high bandwidth backhaul connection, such as leased T1/E1 lines or a microwave link. Thus, the parent RBS consolidates backhaul traffic received from child RBSs on the air interface for transport to other entities in the network over the conventional backhaul link, and distributes backhaul traffic received through its conventional backhaul link for the child RBSs to those child RBSs via transmission on the air interface. Essentially, one RBS transmits backhaul traffic to another RBS as would a mobile station transmit mobile station traffic.

One exemplary embodiment uses simplex links between the parent RBS and a child RBS. With such an arrangement, the parent and child RBSs each have an associated "backhaul module" that may be thought of as a specially configured mobile station (e.g., cellular phone) that includes a directional backhaul antenna. The backhaul module at the parent RBS transmits forward backhaul traffic on the allocated air interface channel(s) via its high-gain antenna, and such transmissions are received by the child RBS(s) preferably on the child's primary antenna, i.e., the cell site's air interface antenna, used to support mobile station communications. Similarly, the backhaul module at the child RBS transmits reverse backhaul traffic to the parent RBS via its high-gain, directional backhaul antenna for receipt at the parent RBS via the parent's primary antenna.

Use of the simplex links, among other things, avoids using any portion of the RBS's transmit power for backhaul traffic transmission, and provides the flexibility to assign the simplex links to use air interface spectrum in either the forward or reverse link allocations. That is, a given simplex backhaul link may be allocated an air interface channel from either the forward or reverse links of the air interface, depending on which of the forward and reverse links is more heavily loaded. Generally, one would allocate air interface channels for backhaul traffic transmission from the more lightly loaded of the forward and reverse links.

In other exemplary embodiments, one of the parent and child RBSs includes a backhaul module configured with a high-gain receive or transmit antenna, and the other one of the RBSs transmits or receives, respectively, on its primary antenna. With such configurations only one backhaul module is needed at either the child or parent RBS. In still other configurations, only one backhaul module is used, but the module includes a high-gain antenna or antennas for duplex transmit and receive operations. In such configurations, the child RBS might, for example, use its associated backhaul module to transmit reverse backhaul traffic to the parent RBS and receive forward backhaul traffic from the parent RBS. In turn, the parent RBS could transmit and receive backhaul traffic using its primary antenna without need for an associated backhaul module or additional antennas.

Generally, the child and parent RBSs include transceiver resources, such as modulators and demodulators, transmitters and receivers, and various supporting hardware and software for supporting the air interface operations. Where the child RBS includes a full-duplex backhaul module, the RBS generally includes one or more backhaul processors that process reverse and forward backhaul traffic to and from the parent RBS, and interface with transmit and receive data processors managing mobile station traffic transmitted and received on the air interface. Where the child RBS includes a simplex backhaul module and receives forward backhaul traffic on its primary antenna, it generally includes a receive data processor to separate mobile station and backhaul traffic and one or more backhaul processors to operate on the separated backhaul traffic received from the parent RBS and to format received mobile transmissions and overhead data as reverse backhaul traffic for transmission to the parent RBS via the backhaul module.

In complementary fashion, the parent RBS includes, in one or more exemplary embodiments, one or both forward and reverse backhaul processors, as well as a backhaul interface to the conventional backhaul link communicatively coupling the parent RBS to the wireless network. Backhaul processing in the parent RBS includes formatting traffic received through the conventional backhaul link for transmission as forward backhaul traffic over the allocated air interface channel. Similarly, the parent RBS re-formats reverse backhaul traffic received over the air interface from child RBSs for transmission via the conventional backhaul link. In at least some embodiments, such re-formatting involves multiplexing a plurality of users' data streams (voice and/or packet data) onto the allocated air interface channel(s) for forward backhaul transmission to the child RBS(s), and de-multiplexing complementary reverse backhaul traffic received from the child RBS(s).

DETAILED DESCRIPTION OF THE INVENTION

Figure 1:
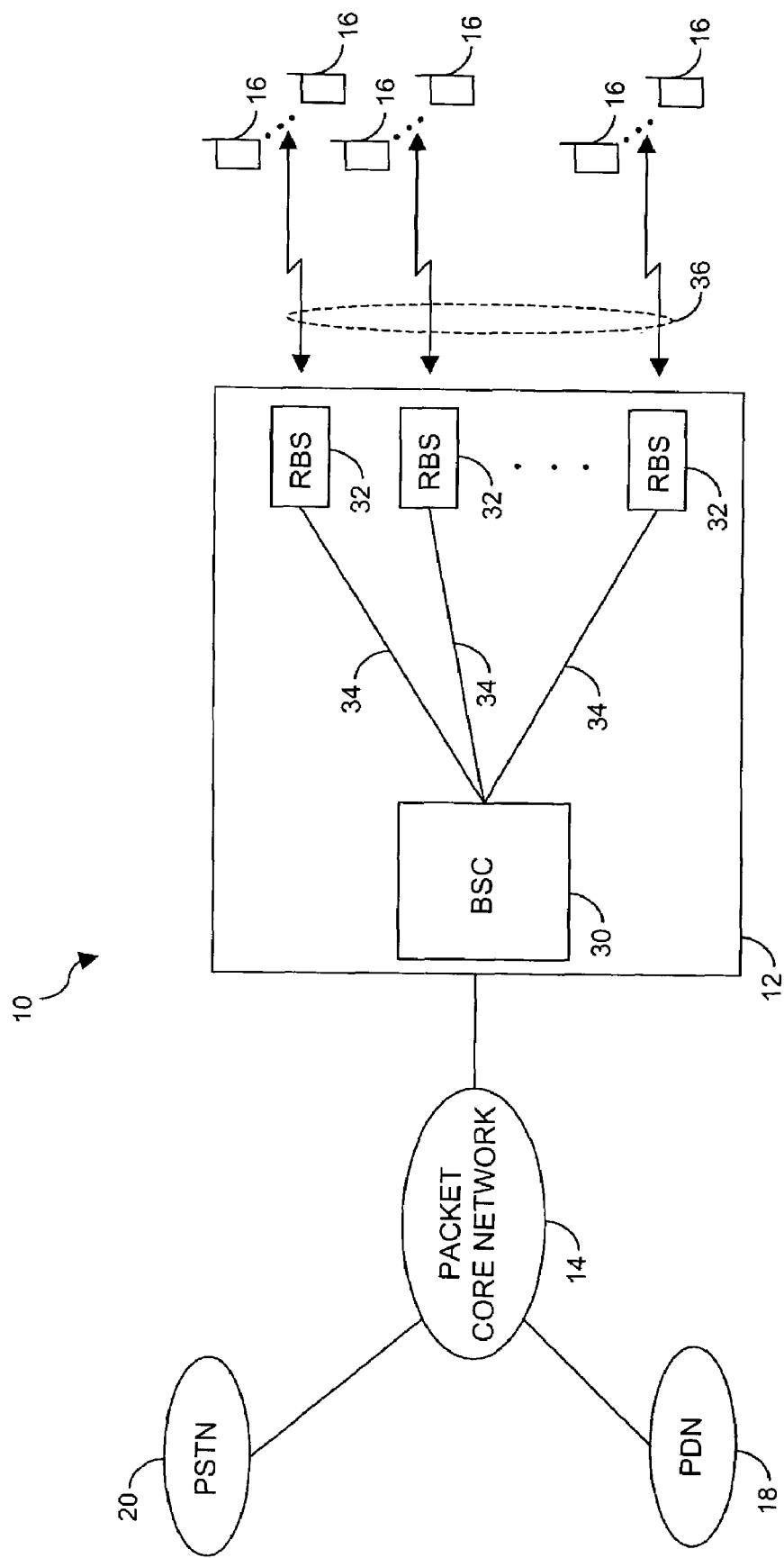
FIG. 1 is a diagram of a conventional wireless communication network.

FIG. 1 illustrates a conventional wireless communication network generally referred to by the numeral 10. Network 10 comprises one or more Base Station Systems (BSSs) 12, and a Core Network 14, which communicatively couple mobile stations 16 to one or more other communication networks such as a Packet Data Network (PDN) 18, e.g., the Internet, and the Public Switched Telephone Network (PSTN) 20. Network 10, as illustrated, supports both circuit-switched communication, e.g., voice and fax, and packet-switched communication, e.g., IP-based communication.

BSS 12 provides the radio link to mobile stations 16, and translates between the radio link data formats and protocols and the core network's data formats and protocols. In support of such functions, BSS 12 comprises one or more Base Station Controllers (BSCs) 30, each supporting one or more Radio Base Stations (RBSs) 32. The RBSs 32 are each coupled to the BSC 30 by a backhaul link 34.

In operation, the radio link, collectively denoted as air interface 36, carries mobile station traffic between the RBSs 32 and the various mobile stations 16 supported by them. Air interface 36 represents not only the radio spectrum allocated to wireless communication between BSS 12 and the mobile station 16, but also includes the controlling protocols, channel organizations, data formatting, etc., that define the details of radio communication used by network 10. Those skilled in the art will appreciate that numerous standardized air interfaces exist, with notable examples of air interface standards including cdmaONE, cdma2000, Wideband CDMA (WCDMA), GSM, and TIA/EIA/IS-136.

In general terms, a given RBS 32 receives traffic from one or more mobile stations 16 via a reverse link of air interface 36, and reformats that received traffic for transmission to the BSC 30 via its dedicated backhaul link 34. Similarly, traffic intended for mobile stations 16 supported by that given RBS 32 is forwarded from Core Network 14 to the BSC 30, which transmits it to the given RBS 32 via the corresponding backhaul link 34. The given RBS 32 formats this backhaul traffic for transmission over the forward link of the air interface 36 to the intended mobile stations 16.

Backhaul links 34 typically comprise dedicated lines, such as leased T1/E1 lines or dedicated microwave links that provide a reliable and relatively high bandwidth connection between an RBS 32 and its supporting BSC 30. As such, backhaul links 34 represent a potentially significant component of network deployment costs, and, in some areas, represent significant construction challenges. For example, in regions of the world where the wired infrastructure is immature or non-existent, it may be impractical to install high-speed backhaul links 34 to a plurality of RBSs 32. Thus, the opportunity to deploy wireless communication networks is limited in areas where the costs and technical difficulties associated with installing backhaul links 34 are prohibitive.

Figure 2:
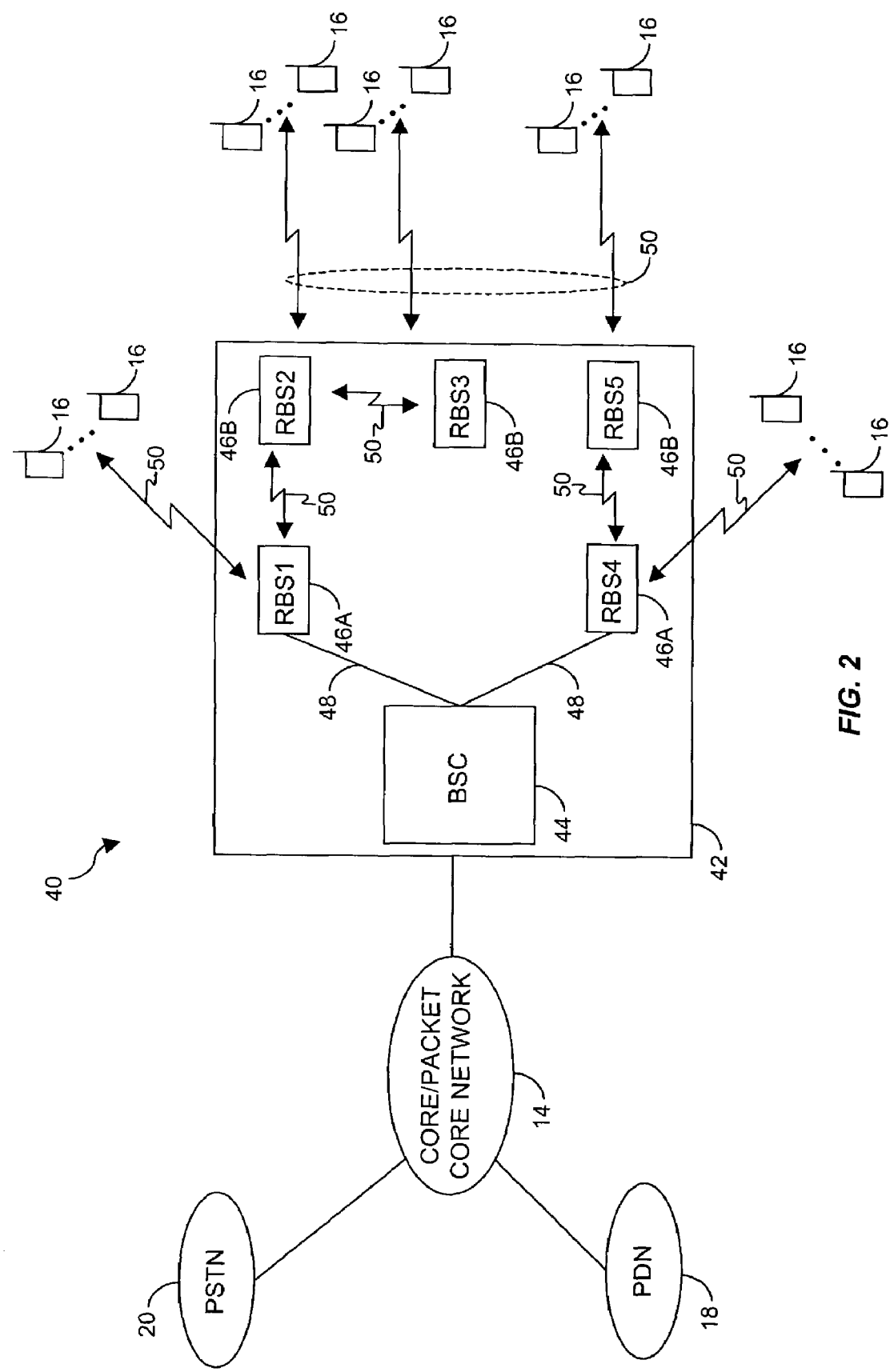
FIG. 2 is a diagram of an exemplary wireless communication network for practicing the present invention.

The present invention addresses such concerns and limitations, and FIG. 2 is a diagram of an exemplary wireless communication network 40 in which the present invention may be practiced. As with the conventional network 10, network 40 communicatively couples mobile stations 16 to various external networks 18 and 20 via the Core Network 14. However, network 40 includes one or more BSSs 42 that include exemplary operating features and equipment significantly reducing the cost and complexity associated with deploying or expanding network 40.

BSS 42 includes one or more BSCs 44, with each BSC 44 supporting one or more RBSs 46. Here, RBSs 46 are designated as "parent" RBSs 46A or "child" RBSs 46B. Parent RBSs 46A include a primary backhaul interface which links to BSC 44 through a backhaul link 48, which may use T1/E1 or microwave links. In contrast, child RBSs 46B have backhaul links to one or more other RBSs 46 via the mobile station air interface 50 ordinarily used for carrying traffic and control signaling to and from mobile stations 16. In one or more exemplary embodiments of the present invention, air interface 50 comprises a cdma2000 air interface.

In the context of the present invention, child RBSs 46B use the mobile station air interface 50 for carrying backhaul traffic to and from other child RBSs 46B and/or parent RBSs 46A. In the context of this discussion, it should be understood that the term "backhaul traffic" includes the voice and data traffic associated with the various mobile stations 16, and may further include overhead channel information (broadcast channel data), as well as radio base station control and maintenance information, which may be collectively referred to as "network signaling." Thus, as used herein, backhaul traffic denotes a combined backhaul stream comprising a combination of mobile station traffic and network signaling that, in at least some embodiments, has been multiplexed together or otherwise consolidated for transport via one or more channels allocated from the air interface 50.

According to the illustration, RBS1 and RBS4 are configured as parent RBSs 46A, and RBS2, RBS3 and RBS5 are configured as child RBSs 46B. RBS1 receives backhaul traffic from BSC 44 via the corresponding backhaul link for mobile stations 16 supported by it, and for those supported by RBS2 and RBS3. Similarly, RBS1 sends backhaul traffic to BSC 44 via the corresponding backhaul link based on mobile station traffic received at RBS1, RBS2, and RBS3. Likewise, RBS4 sends and receives backhaul traffic to and from BSC 44 via its backhaul link 48 for mobile stations 16 supported by it and for those supported by RBS5.

In an exemplary operation, RBS1 receives primary backhaul traffic from BSC 44. The primary backhaul traffic includes first data for mobile stations 16 supported by RBS1 and second data for mobile stations 16 supported by RBS2 or RBS3, as well as any required broadcast channel and RBS control/maintenance information. Thus, each RBS 46 receiving backhaul traffic via air interface 50 may process that traffic to extract any RBS control and signaling information it might contain that is intended for the receiving RBS 46, and may also process the traffic to extract mobile station control and traffic data intended for the mobile stations supported by it. Here, RBS1 extracts the first data and transmits it over a forward link of air interface 50 to the targeted mobile stations 16.

Further, RBS1 processes the second data for transmission over air interface 50 as forward backhaul traffic for reception by RBS2. As noted, this second data may include traffic and control information intended for mobile stations 16 supported by RBS2 and RBS3, and may include control and/or maintenance signaling for RBS2 and RBS3.

In turn, RBS2 extracts data targeted to it and its supported mobile stations 16 from the forward backhaul traffic it receives from RBS1, and relays or otherwise passes along the remaining forward backhaul traffic intended for RBS3 by transmitting it to RBS3 via air interface 50. Operations between RBS4 and RBS5 are consistent with such operation, although RBS5 does not relay backhaul traffic to and from other child RBSs 46B. Reverse backhaul traffic from RBS3 to RBS2 and on to RBS1, and from RBS5 to RBS4 is transmitted in similar fashion using air interface 50.

Notably, RBS1 may transmit forward backhaul traffic to RBS2 on either a forward link channel or a reverse link channel of air interface 50. In either case, RBS1 transmits forward backhaul traffic to RBS2 on a given channel or channels allocated from air interface 50, and RBS2 receives that forward link backhaul traffic on the same channel or channels. Similarly, RBS2 uses one or more allocated forward or reverse link air interface channels to transmit reverse backhaul traffic to RBS2. Likewise, backhaul traffic between RBS2 and RBS3 passes on additional channels allocated from air interface 50. In this manner, backhaul traffic transmissions from any given RBS 46 to another RBS 46 via air interface 50 are received in essentially the same manner as mobile station traffic, although such backhaul traffic generally is processed differently from mobile station traffic.

Moreover, the selection and use of forward and reverse link channels from air interface 50 for transmission of backhaul traffic may be based on the relative capacity utilization of the forward and reverse links of air interface 50. For example, in cdma2000 networks, the forward link of the air interface typically is more fully utilized than the reverse link because of the data asymmetry associated with many types of packet data services such as web browsing, i.e., the mobile stations 16 typically receive more data than they send. Indeed, the RBSs 46 may transmit backhaul traffic according to the air interface but using one or more different carrier frequencies than used for the mobile station traffic.

By using air interface 50 for backhaul communication, multiple child RBSs 46B may be supported by a single parent RBS 46A meaning that only one backhaul link 48 need be established between BSC 44 and the parent RBS 46A. Thus, as was earlier noted, network 40 may be deployed or expanded with minimal expense and construction difficulty. Moreover, the air interface 50 represents a "resource" already owned or otherwise controlled by the network operator, such that using it for carrying backhaul traffic in addition to mobile station traffic actually increases utilization efficiency of air interface 50. For example, where one or more RBSs 46 are deployed in relatively remote areas or other light usage areas, the volume of mobile station traffic often does not approach the full capacity of the air interface 50, and using a portion of the reserve capacity of the air interface 50 for backhaul traffic thus increases its utilization efficiency.

Thus, the deployment of child RBSs 46B is preferably done in geographic areas where mobile station traffic is not expected to completely utilize the air interface's available data channels. Using one or more channels of the air interface 50 for carrying backhaul traffic does reduce the number of channels available for allocation to mobile stations 16, but such a reduction imposes little practical downside in service areas where the total air interface capacity of the involved RBSs 46 is not being fully used.

Further flexibility derives from the various arrangements of parent and child RBSs 46, with only two of the several possibilities illustrated in FIG. 2. For example, FIG. 2 illustrates RBS1, RBS2 and RBS3 in a "daisy chain" configuration where RBS2 relays forward backhaul traffic to RBS3 from RBS1 and reverse backhaul traffic to RBS1 from RBS3. However, one or both RBS2 and RBS3 could support additional child RBSs 46B, either directly as in a "star" configuration, or indirectly through additional daisy chains. Likewise, RBS1 and RBS4 could, as parent RBSs 46A, support additional child RBSs 46B directly or indirectly. It should be understood that the present invention encompasses all such arrangements.

Generally, the number and arrangement of child RBSs 46B that may be supported by a given parent RBS 46A depend on the particulars of network 40. More specifically, there may be a practical limit regarding the number of child RBSs 46B that may be supported by given parent RBSs 46A. Such limitations may simply involve the practical consideration of leaving sufficient capacity on the air interface 50 for supporting mobile station communication concurrent with backhaul communication.

Additional limitations regarding the number of child RBSs 46B that may be linked in daisy chain fashion to a parent RBS 46A may arise due to timing limitations of the air interface 50. For example, in cdma2000 standards, voice traffic is carried in successive 20 millisecond frames and each child RBS 46B may impose up to one voice frame of delay in processing forward or reverse backhaul traffic. Thus, beyond a certain number of "hops" through child RBSs 46B, the cumulative delay may become unacceptable.

Regardless of the particular arrangements of parent and child RBSs 46, use of the air interface 50 to carry backhaul traffic greatly simplifies network deployment. However, the specific manner in which the air interface 50 is used for backhaul traffic depends on its details. For example, if network 40 is based on cdma2000 standards, a parent RBS 46A and its supported child RBSs 46B each preferably allocate one or more high-speed data channels (Packet Data Channels) for carrying backhaul traffic from the air interface's defined set of communication channels. Channels not allocated to backhaul traffic usage remain available for supporting mobile station communication.

In an exemplary embodiment, a given parent RBS 46A allocates one or more available data channels from air interface 50, and uses these allocated channels to send forward backhaul traffic to a given child RBS 46B and receive reverse backhaul traffic from that child RBS 46B. As highlighted earlier, forward backhaul traffic carried on air interface 50 from, for example, RBS1 to RBS2, may be destined for distribution to mobile stations 16 supported by RBS2, or may be destined for mobile stations 16 supported by RBS3. In the latter case, RBS2 typically allocates another of its available data channels from air interface 50 for relaying forward backhaul traffic onto RBS3. Further, note that the forward backhaul traffic received by RBS2 typically includes a mix of communication traffic intended for mobile stations 16 supported by RBS2 and mobile stations 16 supported by RBS3. In this scenario, RBS2 processes the forward backhaul traffic to separate data intended for its mobile station 16 from the backhaul traffic intended for RBS3.

Figure 3A:
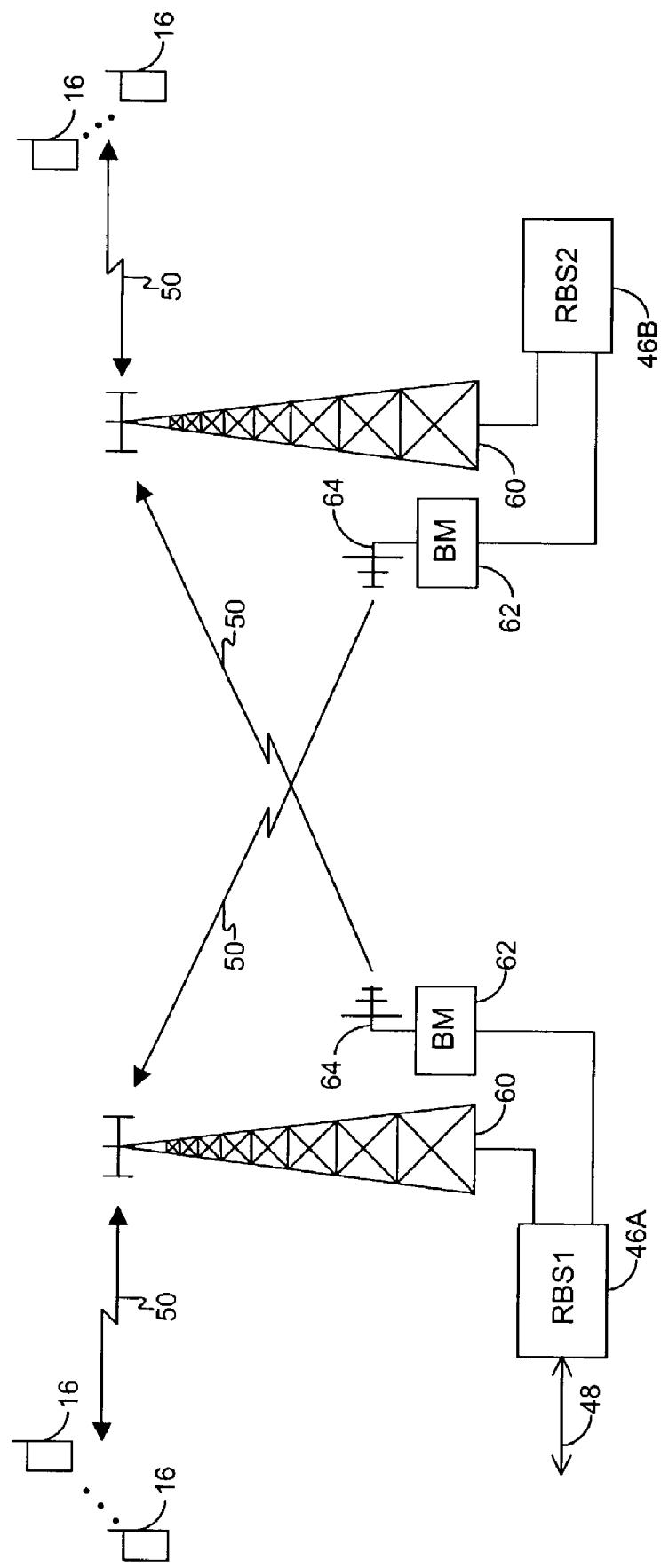
FIGS. 3A-3D are diagrams of various exemplary embodiments for configuring child and parent radio base stations in the network of FIG. 2 for air interface based backhaul communication.

FIG. 3A illustrates an exemplary configuration of a parent RBS 46A and a child RBS 46B. Parent RBS 46A includes or is associated with a primary antenna 60 that serves as a "cell site" antenna providing radio reception and transmission via air interface 50. Parent RBS 46A further includes or is associated with a backhaul module 62 and its associated antenna 64. Similarly, child RBS 46B includes or is associated with a primary antenna 60, and a backhaul module 62 and its associated antenna 64. With this exemplary configuration, the parent RBS 46A uses its backhaul module 62 to send forward backhaul traffic to RBS2 via forward link 50 for reception by the child RBS 46B on the child's primary antenna 60. Likewise, the child RBS 46B uses its backhaul module 62 to send reverse backhaul traffic on air interface 50 to the parent RBS 46A for reception on the parent's primary antenna 60.

From the perspective of the child RBS 46B, the parent's backhaul module 62 essentially functions as a mobile station 16 having only a simplex link for transmitting forward backhaul traffic over air interface 50 to the child. Generally, where the backhaul module 62 is used to transmit backhaul data, its antenna 64 comprises a high-gain, directional antenna that is well suited for transmitting a relatively high-gain signal that is easily received by the primary antenna 60 of another RBS 46.

Thus, in the illustrated embodiment, the child and parent RBSs 46 each have a backhaul module 62 with associated directional antenna 64 for transmitting backhaul traffic to each other. Note that parent RBS 46A may transmit forward backhaul traffic to the child on a forward or reverse link channel of air interface 50. Likewise, the child RBS 46B may transmit reverse backhaul traffic to the parent on a forward or reverse link channel of air interface 50. In one particularly advantageous embodiment, both the parent RBS 46A and the child RBS 46B may use reverse link channels from the air interface 50.

Figure 3B:
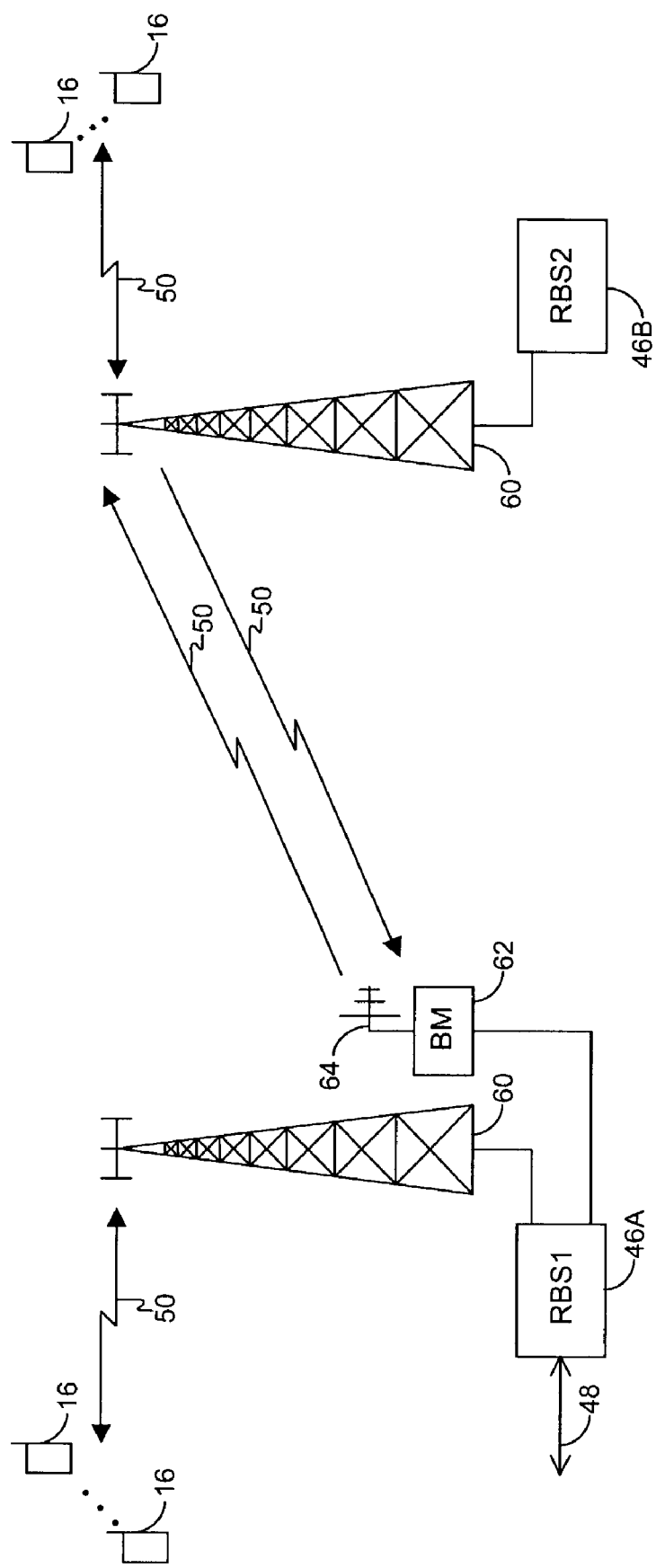

FIG. 3B illustrates another exemplary embodiment of parent RBS 46A and child RBS 46B. Here, parent RBS 46A includes or is associated with a backhaul module 62 that provides duplex transmission and reception of forward and reverse backhaul traffic to and from child RBS 46B via air interface 50. With such a configuration, antenna 64 at the backhaul module 62 of the parent includes both transmit and receive capabilities (transceiver resources). Reverse backhaul traffic transmitted over air interface 50 from the child's primary antenna 60 is received at the backhaul module 62 of the parent via antenna 64. As with other exemplary configurations of the present invention, the parent RBS 46A and the child RBS 46B retain the ability to support mobile station communication over air interface 50 concurrent with transmitting and receiving backhaul traffic.

Figure 3C:
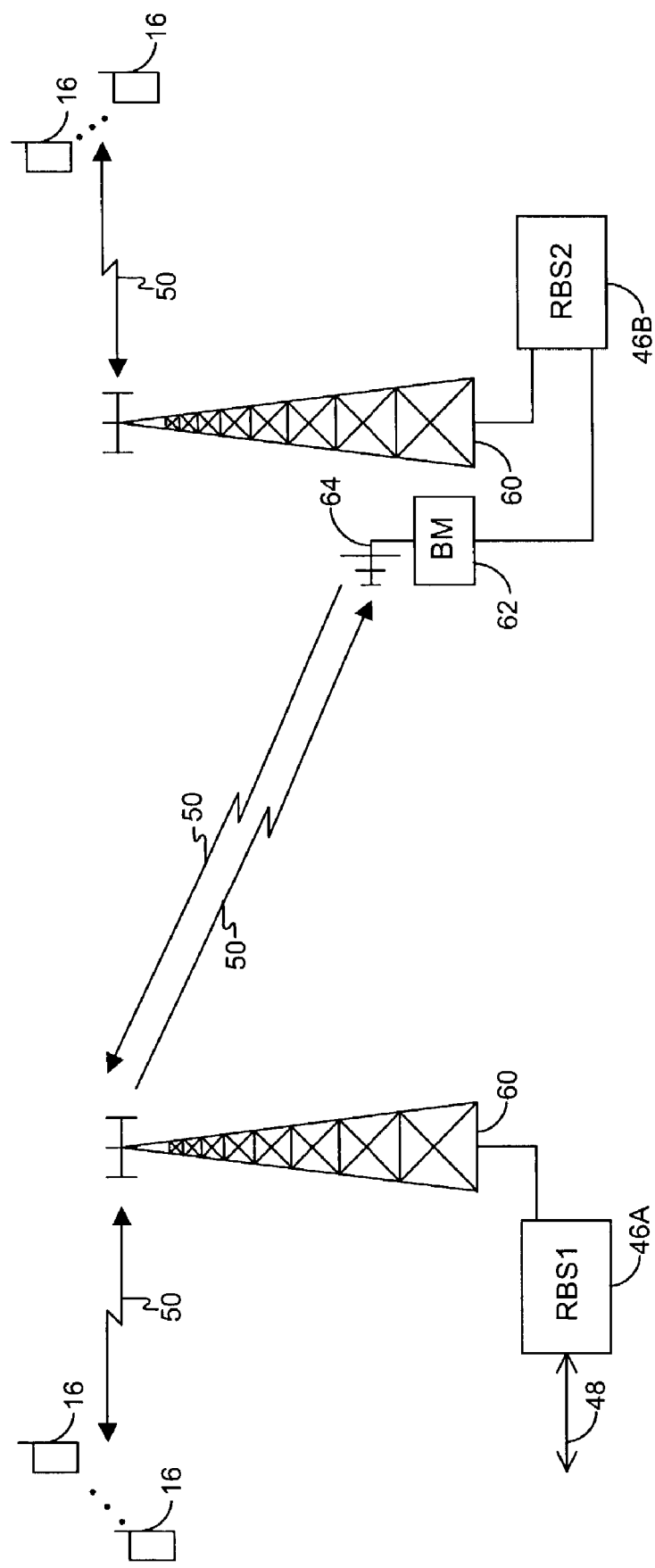

FIG. 3C illustrates yet another exemplary configuration of parent RBS 46A and child RBS 46B. Here, parent RBS 46A transmits forward backhaul traffic to and receives reverse backhaul traffic from the child RBS 46B using its primary antenna 60. The child RBS 46B transmits reverse backhaul traffic to the parent RBS 46A using the child's backhaul module 62 and directional antenna 64, and receives forward backhaul traffic through its backhaul module 62 via its directional antenna 64.

In this configuration, child RBS 46B uses first transceiver resources in backhaul module 62 to transmit and receive backhaul traffic through directional antenna 64. Such an arrangement differs from exemplary configurations where the backhaul module(s) 62 at the parent RBS 46A supports full duplex transmission and reception of backhaul traffic. The configuration of backhaul modules 62 at the parent and child RBSs 46 may be configured as simplex or duplex, and such configuration options help balance the use of RBS resources in support of backhaul traffic transmission/reception.

Figure 3D:
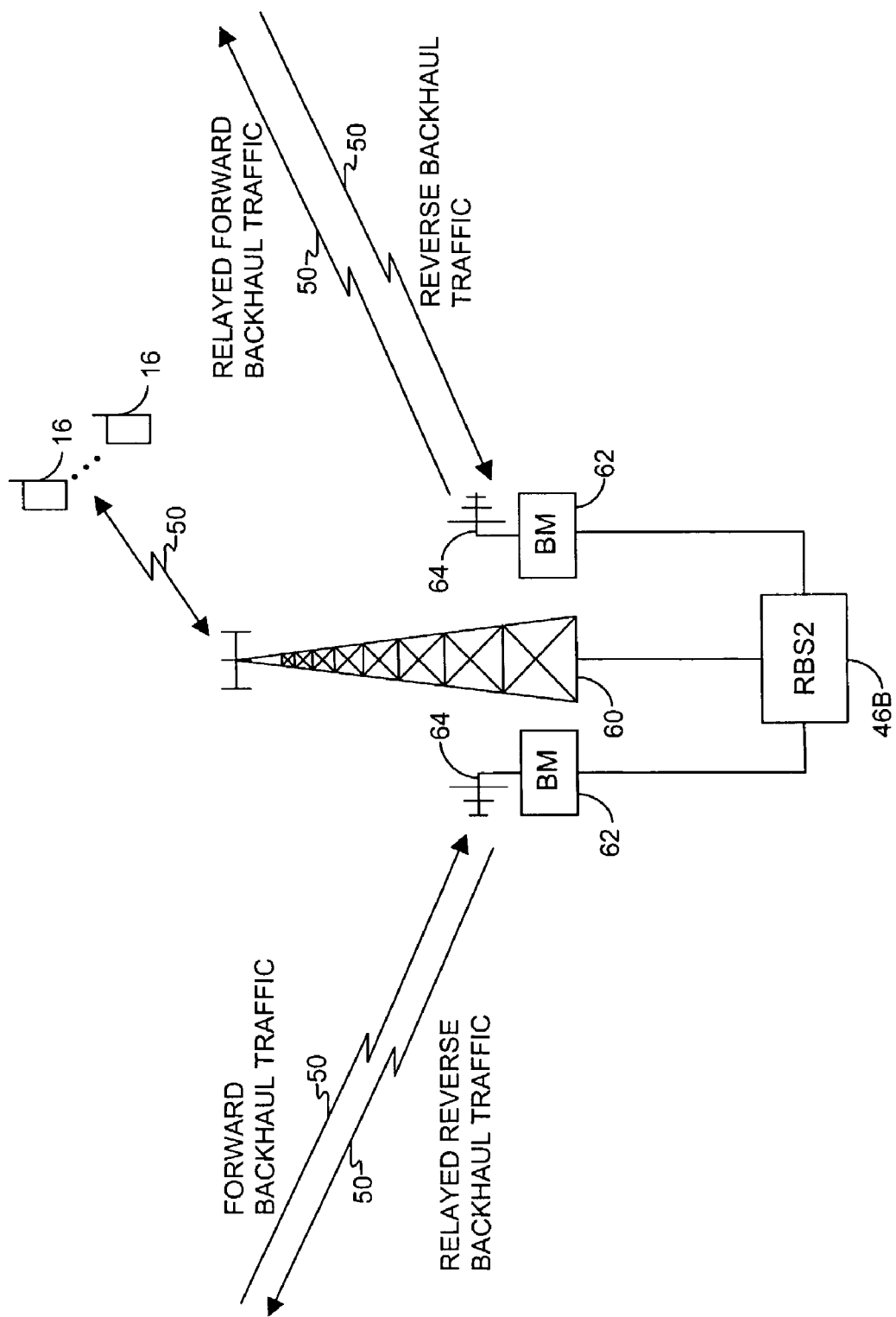

FIG. 3D is a diagram of an exemplary embodiment of a child RBS 46B serving as a "relay" for backhaul traffic. It should be understood that the use of two backhaul modules 62 at the child RBS 46B is not necessary for relay operations, but merely represents one advantageous arrangement for relaying backhaul traffic. Here, the child RBS 46B uses one backhaul module 62 to receive reverse backhaul traffic from another child RBS 46B, and another backhaul module 62 to transmit the relayed reverse backhaul traffic to an upstream child RBS 46B or to a supporting parent RBS 46A.

The child RBS 46B may further receive forward backhaul traffic for relaying to downstream child RBSs 46B via its primary antenna 60. Thus, the child relays forward backhaul traffic received on its primary antenna to a downstream child through one of its backhaul modules 62, and relays reverse backhaul traffic received from the downstream child on one of its backhaul modules 62 using its other backhaul module 62. As with the other configurations, the child RBS 46B supports concurrent mobile station communication on air interface 50.

Figure 4:
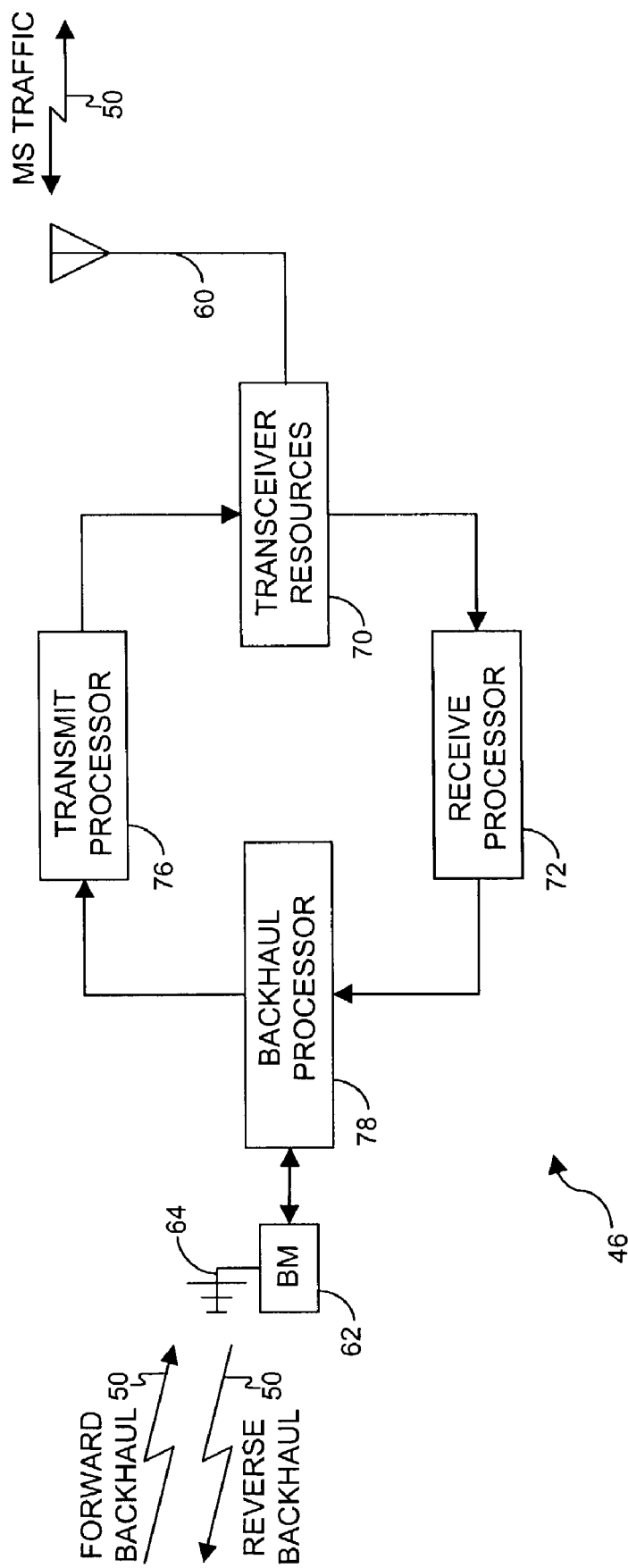
FIG. 4 is a diagram of an exemplary child radio base station for use in the network of FIG. 2.

FIG. 4 is an exemplary embodiment of the processing and transceiver resources for an exemplary child RBS 46B. In this embodiment, the child RBS 46B includes first transceiver resources for sending and receiving backhaul traffic and second transceiver resources for sending and receiving mobile station traffic. Here, the child RBS 46B includes a full-duplex backhaul module 62 that includes the first transceiver resources coupled to directional antenna 64. The second transceiver resources are shown as transceiver resources 70 coupled to the primary antenna 60. Child RBS 46B further includes a transceiver processor comprising receive processor 72 and transmit processor 76, and a backhaul processor 78.

As regards the overall depicted arrangement, it should be understood that the diagram depicts a functional organization that may not correspond to the actual physical implementation of equipment within the RBS 46. Further, it should be understood that the various processors illustrated, e.g., transmit processor 76, etc., are illustrated as single functional blocks but may actually be implemented as a collection of physical processors, processing systems or sub-systems, etc., that cooperate to perform the represented functionality. Such arrangements of processing elements and supporting software within wireless communication network entities is well understood by those skilled in the art.

In any case, with the full-duplex capability of backhaul module 62, child RBS 46B receives forward backhaul traffic and transmits reverse backhaul traffic through backhaul module 62 using the directional secondary antenna 64. Thus, the backhaul processor 78 is coupled to the transceiver resources included in the backhaul module 62, and processes the backhaul traffic transmitted and received through the module. Forward backhaul traffic received by child RBS 46B is processed by backhaul processor 78 for input to transmit processor 76 which is configured to format the traffic for transmission as mobile station traffic via transceiver resources 70 and primary antenna 60. Similarly, mobile station traffic received on primary antenna 60 is processed by transceiver resources 70 for input to receive processor 72, which provides the received mobile station traffic to backhaul processor 78. The backhaul processor 78 formats the mobile station traffic for transmission by backhaul module 62 as reverse backhaul traffic via air interface 50.

Figure 5:
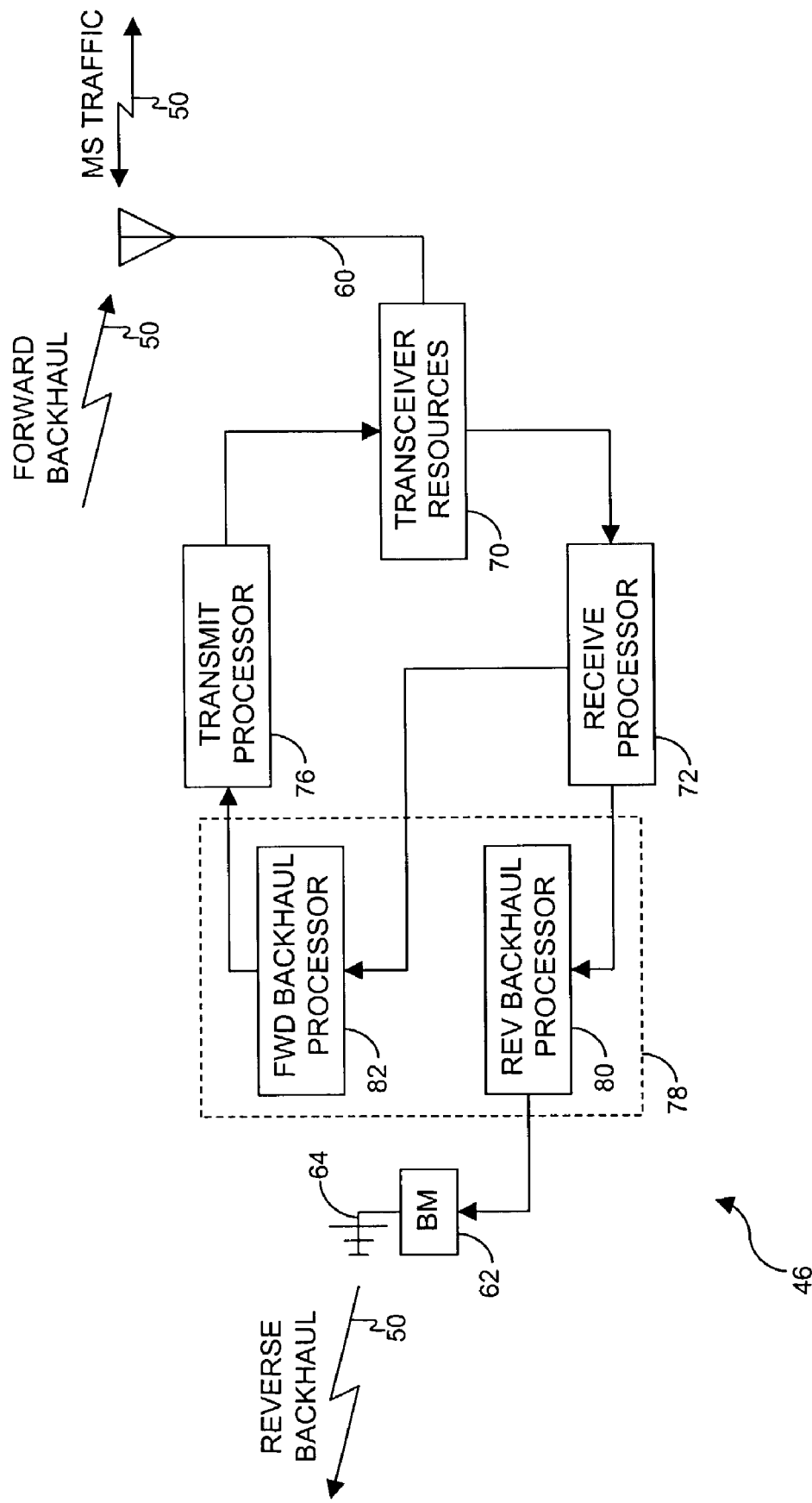
FIG. 5 is a diagram of another exemplary embodiment for a child radio base station for use in the network of FIG. 2.

FIG. 5 is another exemplary embodiment of a child RBS 46B, which transmits reverse backhaul traffic via its included backhaul module 62 and associated secondary antenna 64, and receives forward (and/or relayed) backhaul traffic via its primary antenna 60. Thus, the first transceiver resources used to send and receive backhaul traffic are implemented partially in backhaul module 62 (for backhaul transmission) and partially in the transceiver resources 70 (for backhaul reception) that are also used for mobile station traffic.

Together the reverse backhaul processor 80 and forward backhaul processor 82 comprise the earlier discussed backhaul processor 78. In operation, then, the child RBS 46B uses a simplex backhaul transmission link supported by transmitter resources included in backhaul module 62 and receiver resources in transceiver resources 70. In this arrangement, receive processor 72 passes at least a portion of received forward backhaul traffic to the forward backhaul processor 82 for demultiplexing and subsequent transmission as broadcast and/or mobile station traffic via primary antenna 60.

Relayed backhaul traffic and incoming data from mobile stations 16 received on primary antenna 60 passes from the receive processor 72 to the reverse backhaul processor 80, which processes that data, along with any local RBS control and operating information, as reverse backhaul traffic for transmission from directional antenna 64 via module 62. Note that the child RBS 46B could reverse the illustrated arrangement such that it receives forward backhaul traffic via backhaul module 62 and transmits reverse (or relayed) backhaul traffic via its primary antenna 60. In such a scenario, the simplex implementation of backhaul module 62 would include receiver resources rather than transmitter resources.

Figure 6:
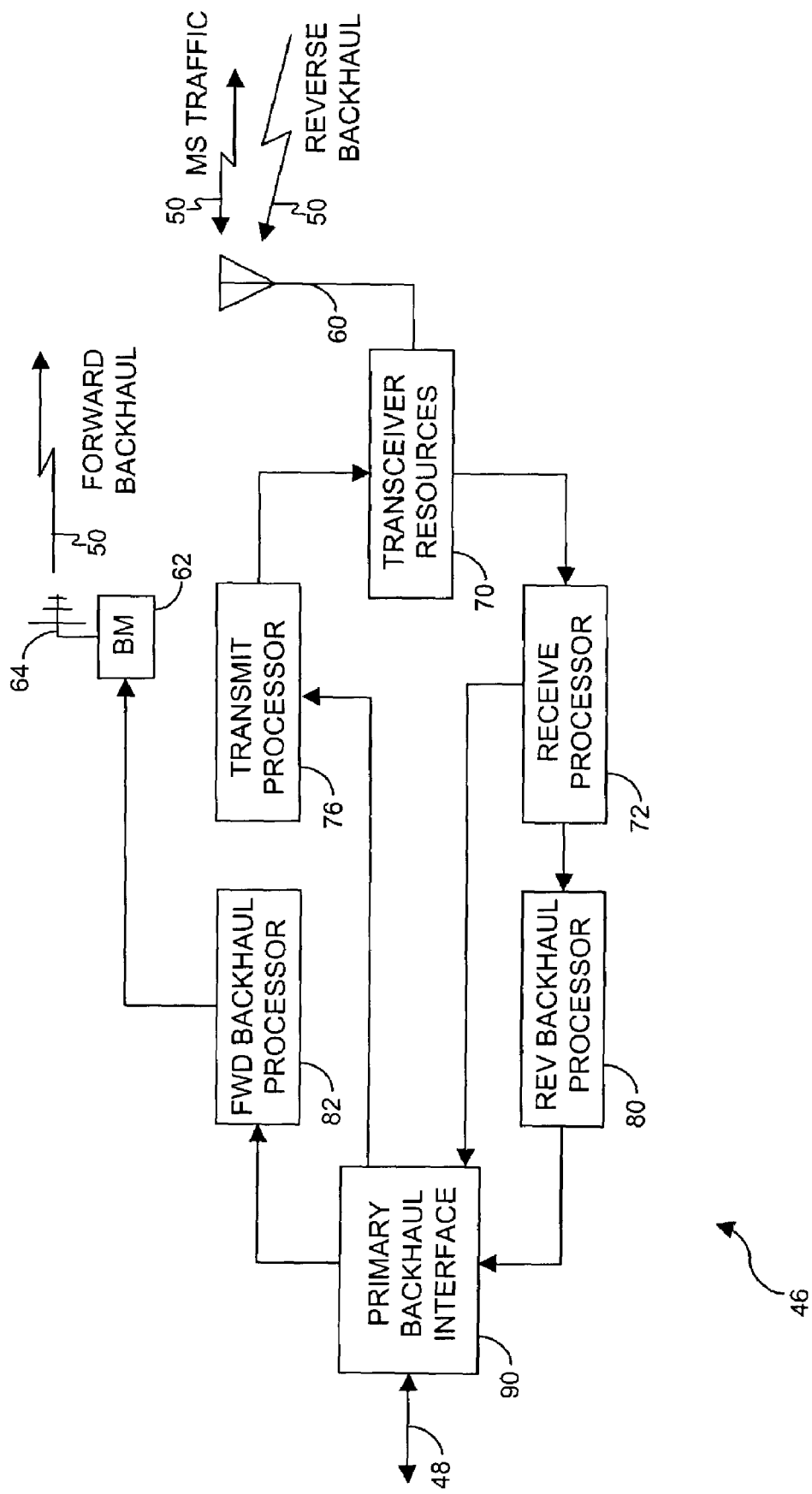
FIG. 6 is a diagram of an exemplary embodiment for a parent radio base station for use in the network of FIG. 2.

FIG. 6 discloses an exemplary embodiment of a parent RBS 46A. Parent RBS 46A includes primary antenna 60, backhaul module 62, transceiver resources 70, receive processor 72, transmit processor 76, and reverse and forward processors 80 and 82 similar to one or more embodiments of the child RBSs 46B. Additionally, parent RBS 46A includes a primary backhaul interface 90 adapted to interface parent RBS 46A to the supporting BSC 44 through one of the dedicated backhaul links 48. In many respects, operation of the various elements of parent RBS 46A are consistent with the earlier descriptions for the same elements in the context of the child RBSs 46B. However, here the reverse and forward backhaul processors 80 and 82 may perform additional formatting or translation functions associated with adapting the backhaul traffic sent to and from the child RBSs 46B to the standardized primary backhaul interface 90.

For example, primary backhaul traffic received from the BSC 44 may be targeted to one or more child RBSs 46B supported by the parent RBS 46A, and the parent may multiplex such backhaul traffic into one or more data streams suitable for transmission over air interface 50. In an exemplary embodiment, data streams corresponding to different voice and/or data calls are multiplexed into a combined backhaul traffic stream suitable for transport over one or more data channels allocated from the air interface 50.

In a cdma2000 implementation, multiple 9.6 kbps (or other standardized data rate) voice calls may be multiplexed onto a single 144 kbps supplemental packet data channel (SCH) available for use in air interface 50. Thus, the parent RBS 46A receives backhaul traffic including voice traffic for multiple mobile stations, selects the backhaul traffic targeted to its child RBSs 46B, and processes that traffic for transmission as forward backhaul traffic over the air interface 50 by multiplexing it onto one or more supplemental channels. In turn, the receiving child RBS 46B (or RBSs) processes the received forward backhaul traffic by extracting data targeted to it (i.e., mobile station traffic and network signaling data), and relays the rest of it to downstream child RBSs 46B, if any, on one or more other allocated air interface channels.

In complementary operations, the reverse backhaul processor 80 of parent RBS 46A processes the reverse backhaul traffic received from the one or more child RBSs 46B supported by the parent. In an exemplary embodiment, such processing involves demultiplexing the combined data stream(s) that comprises the reverse backhaul traffic received from the child RBSs 46B. After demultiplexing the combined stream into the data streams corresponding to the different mobile stations 16, the backhaul processor 80 formats it for transmission as primary backhaul traffic over link 48 to BSC 44.

In general, the present invention applies multiplexing and demultiplexing, which may be referred to as "trunking" and "de-trunking," to significant advantage. That is, a single logical channel of the air interface 50 may be used to carry backhaul traffic representing a collection of RBS control, signaling, and broadcast channel data for one or more RBSs 46, as well as mobile station traffic for multiple mobile stations 16 supported by those one or more RBSs 46.

Thus, as an example of exemplary trunking/de-trunking operations, RBS1 trunks or "bundles" RBS control streams, broadcast channel streams and mobile station traffic streams for RBS2 and RBS3, onto one or more logical channels of air interface 50 for transmission as forward backhaul traffic to RBS2. RBS2 receives such backhaul traffic, de-trunks it to recover control and traffic streams intended for it or for mobile stations 16 supported by it, and re-trunks the balance of such traffic for relay transmission to RBS3 via another channel of air interface 50. Similar trunking/de-trunking operations play out for the reverse backhaul traffic arriving at RBS1 via the RBS3/RBS2 relay chain.

Note that where the parent and child RBSs 46 carry voice-based backhaul traffic over packet data channels of air interface 50, transmission of that backhaul traffic may be altered slightly from that used for conventional mobile station packet data traffic to maintain acceptable voice quality. For example, packet data retry may be disabled on the air interface channels carrying voice-based backhaul traffic. Packet data retry, generally implemented at the Radio Link Protocol (RLP) layer of BSS 42, is appropriate for true packet data transfers where such a retry mechanism ensures data integrity but is inappropriate for the ordered delivery of time-sensitive voice data. Thus, the data retry feature of RLP may disabled in an exemplary cdma2000 implementation where supplemental packet data channels (SCH) are used to carry backhaul traffic.

With data retry disabled, the RBSs 46 may set a more stringent received signal quality for the backhaul traffic signals to ensure that acceptable error levels are maintained. Tightening the signal quality requirements may be accomplished in a variety of ways. For example, the RBSs 46 (or supporting BSC 44) may set the maximum acceptable Frame Error Rate (FER) for backhaul channels at one percent or less rather than the more conventional two percent FER setting associated with mobile station voice traffic.

However, those skilled in the art should appreciate that such "tuning" may or may not be applied to the air interface channels used for backhaul traffic, depending on performance goals and the type of traffic (packetized voice or actual packetized data) carried as backhaul traffic on the air interface 50. Of course, where network 40 uses air interface 50 to carry voice and data backhaul traffic, it may segregate the two types of traffic and allocate specific air interface channels for carrying voice-related backhaul traffic and other air interface channels for carrying data-related backhaul traffic. As such, it might apply the above described tuning to only some of the backhaul channels.

In general, those skilled in the art will recognize that the above discussion highlights exemplary operations and configurations of network 40 in the context of the present invention. However, the present invention is not limited by such details. Indeed, the present invention broadly defines the use of a wireless network's mobile station interface to carry backhaul traffic, including control and signaling information. With this approach, RBSs transmit and receive backhaul traffic using one or more channels allocated from the available air interface channels, and transmit and receive mobile station traffic using the same air interface.

What is claimed is:

1. A method of transferring backhaul traffic between first and second radio base stations (RBSs) in a wireless communication network comprising:
   allocating at least one channel at the first and second RBSs from a wireless communication air interface used by the RBSs to support communication with mobile stations;
   transferring backhaul traffic between the first and second RBSs on the at least one allocated channel; and
   selecting one of a forward link and a reverse link for transferring the backhaul traffic based on a relative availability of traffic capacity among the forward and reverse links, wherein the forward and reverse links are defined by the air interface.

2. The method of claim 1, wherein allocating at least one channel at the first and second RBSs comprises allocating a packet data channel defined by the air interface.

3. The method of claim 2, wherein transferring backhaul traffic between the first and second RBSs comprises transferring a combination of mobile station traffic and network signaling on the packet data channel.

4. The method of claim 3, wherein transferring the combination of mobile station traffic and network signaling on the packet data channel comprises multiplexing a plurality of mobile station traffic streams together with network signaling data into a combined backhaul stream for transmission by the first RBS to the second RBS via the packet data channel.

5. The method of claim 4, wherein the second RBS is a parent RBS having a primary backhaul link to a Base Station Controller, and further comprising:
   receiving the combined backhaul stream at the parent RBS;
   recovering the plurality of mobile station traffic streams from the combined backhaul stream; and
   transferring the recovered mobile station traffic streams to the BSC via the primary backhaul link.

6. The method of claim 4, wherein the second RBS is a child RBS, and further comprising:
   receiving the combined backhaul stream at the child RBS;
   extracting mobile station traffic streams from the combined backhaul stream that are targeted to mobile stations supported by the child RBS; and
   transmitting the extracted mobile station traffic streams to the mobile stations supported by the child RBS on one or more other channels of the air interface.

7. The method of claim 6, further comprising extracting network signaling data targeted to the child RBS from the combined backhaul stream, and processing the extracted network signaling data at the child RBS.

8. The method of claim 7, wherein the extracted network signaling data includes overhead channel data extracted from the combined backhaul stream, and further comprising transmitting the extracted overhead channel data from the child RBS.

9. The method of claim 4, wherein the second RBS is a child RBS, and further comprising:
   receiving the combined backhaul stream at the child RBS, wherein the backhaul stream comprises data targeted to the child RBS and data targeted to one or more subsequent child RBSs;
   extracting the data targeted to the child RBS from the combined backhaul stream; and relaying the data targeted to the one or more subsequent child RBSs as another combined backhaul stream transmitted on another channel of the air interface.

10. The method of claim 4, wherein the first and second RBSs are child RBSs, and further comprising:
transmitting the combined backhaul stream from the first RBS to the second RBS as a combination of network signaling data and mobile station traffic from the first RBS;
receiving the combined backhaul stream at the second RBS and adding network signaling data and mobile station traffic from the second RBS to the combined backhaul stream; and
transmitting the combined backhaul stream to a parent RBS having a primary backhaul connection to a Base Station Controller (BSC).

11. The method of claim 4, further comprising demultiplexing the plurality of mobile station traffic streams from the packet data channel at the second RBS for transmission over the air interface by the second RBS to one or more mobile stations supported by the second RBS.

12. The method of claim 4, wherein multiplexing a plurality of mobile station traffic streams comprises multiplexing a plurality of voice data streams.

13. The method of claim 4, wherein multiplexing a plurality of mobile station traffic streams comprises multiplexing a plurality of packet data streams.

14. The method of claim 1, wherein transferring backhaul traffic between the first and second RBSs comprises:
receiving backhaul traffic from the network on a primary backhaul connection at the first RBS;
formatting the received backhaul traffic as forward backhaul traffic for transmission from the first RBS to the second RBS via the air interface;
receiving mobile station traffic at the second RBS from mobile stations supported by the second RBS; and
formatting the received mobile station traffic as reverse backhaul traffic for transmission from the second RBS to the first RBS via the air interface.

15. The method of claim 14, further comprising transmitting the reverse backhaul traffic to the first RBS from a directional backhaul antenna coupled to the second RBS.

16. The method of claim 15, further comprising receiving the reverse backhaul traffic at the first RBS on a primary antenna used by the first RBS for mobile station communication.

17. The method of claim 14, further comprising transmitting the reverse backhaul traffic to the first RBS from a primary antenna used by the second RBS for mobile station communication.

18. The method of claim 17, further comprising receiving the reverse backhaul traffic at the first RBS on a directional backhaul antenna coupled to the first RBS.

19. The method of claim 14, further comprising transmitting the forward backhaul traffic to the second RBS from a direction antenna coupled to the first RBS.

20. The method of claim 19, further comprising receiving the forward backhaul traffic at the second RBS on a primary antenna used by the second RBS for mobile station communication.

21. The method of claim 14, further comprising transmitting the forward backhaul traffic to the second RBS from a primary antenna used by the first RBS for mobile station communication.

22. The method of claim 21, further comprising receiving the forward backhaul traffic at the second RBS on a directional backhaul antenna coupled to the second RBS.

23. The method of claim 1, wherein transferring backhaul traffic between the first and second RBSs comprises:
receiving forward backhaul traffic at the first RBS transmitted from a third RBS in the network;
relaying the forward backhaul traffic from the first RBS to the second RBS;
receiving reverse backhaul traffic at the first RBS transmitted from the second RBS; and
relaying the reverse backhaul traffic from the second RBS to the third RBS.

24. The method of claim 1, further comprising relaying backhaul traffic between the first RBS and a third RBS by relaying the backhaul traffic through the second RBS via the air interface.

25. The method of claim 1, wherein allocating at least one channel at the first and second RBSs from the wireless communication air interface comprises allocating at least one first channel at the first RBS, and allocating at least one second channel at the second RBS.

26. The method of claim 25, further comprising selecting at least one of the first and second channels from a set of forward link channels or from a set of reverse link channels depending upon the relative capacity utilization of the forward and reverse links comprising the wireless communication air interface.

27. The method of claim 26, further comprising transmitting backhaul traffic on one or more allocated forward link channels if forward link capacity is less utilized than reverse link capacity, and transmitting backhaul traffic on one or more allocated reverse link channels if reverse link capacity is less utilized than forward link capacity.

28. A method of transferring backhaul traffic between first and second radio base stations in a wireless communication network, said method comprising:
allocating at least one channel from a mobile station air interface as an extended backhaul connection to carry backhaul traffic between said first and second base stations;
receiving reverse mobile station traffic at said first base station from one or more mobile stations;
generating reverse backhaul traffic including said reverse mobile station traffic;
transmitting said reverse backhaul traffic over said extended backhaul connection to said second base station;
receiving forward backhaul traffic at said first base station from said second base station over said extended backhaul connection;
extracting forward mobile station traffic from said forward backhaul traffic; and
transmitting said forward mobile station traffic backhaul traffic to said one or more mobile stations.

29. The method of claim 28, wherein allocating at least one channel from a mobile station air interface comprises allocating a data channel available at the second base station from a set of data channels defined by the air interface.

30. The method of claim 29, wherein allocating a data channel available at the second base station comprises allocating one of a forward link or a reverse link data channel available at the second base station.

31. The method of claim 28, wherein generating reverse backhaui traffic from said reverse mobile station traffic comprises multiplexing the mobile station traffic with network signaling data into combined data for transmission to the second base station as the reverse backhaul traffic on the extended backhaul connection.

32. The method of claim 28, wherein receiving forward backhaul traffic at said first base station from said second base station over said extended backhaul connection comprises receiving the forward backhaul traffic as multiplexed mobile station traffic and network signaling data.

33. The method of claim 32, wherein extracting forward mobile station traffic from said forward backhaul traffic comprises demultiplexing the multiplexed mobile station traffic for transmission to individual ones of the mobile stations as forward mobile station traffic.

34. A method of transferring backhaul traffic between first and second radio base stations in a wireless communication network, said method comprising:
  allocating at least one channel from a mobile station air interface as an extended backhaul connection to carry backhaul traffic between said first and second base stations;
  receiving reverse backhaul traffic at said first base station from said second base station;
  combining said reverse backhaul traffic received from said second base station with reverse backhaul traffic generated at said first base station;
  transmitting said combined backhaul traffic from said first base station to a base station controller;
  receiving combined forward backhaul traffic at said first base station for said first and second base stations;
  separating at said first base station the forward backhaul traffic for said second base station from said forward backhaul traffic for said second base station; and
  transmitting said forward backhaul traffic for said second base station from said first base station to said second base station over said extended backhaul connection.

35. The method of claim 34, wherein allocating at least one channel from a mobile station air interface comprises allocating a data channel defined by the air interface and available at the first and second base stations for transmission of reverse backhaul traffic from the second base station to the first base station.

36. The method of claim 34, wherein allocating at least one channel from a mobile station air interface comprises allocating a data channel defined by the air interface and available at the first and second base stations for transmission of forward backhaul traffic from the first base station to the second base station.

37. The method of claim 34, wherein receiving reverse backhaul traffic at said first base station from said second base station comprises receiving multiplexed reverse mobile station traffic and network signaling data from the second base station as the reverse backhaul traffic.

38. The method of claim 37, wherein combining said reverse backhaul traffic received from said second base station with reverse backhaul traffic generated at said first base station comprises combining the multiplexed reverse mobile station traffic and network signaling data from the second base station with reverse mobile station traffic from mobile stations supported by the first base station and network signaling data from the first base station to form the combined backhaul traffic.

39. The method of claim 34, wherein transmitting said combined backhaul traffic from said first base station to a base station controller comprises sending the combined backhaul traffic over a dedicated backhaul link existent between the first base station and the base station controller.

40. The method of claim 34, wherein receiving combined forward backhaul traffic at said first base station for said first and second base stations comprises receiving first forward backhaul traffic targeted to the the first base station and second forward backhaul traffic targeted to the second base station.

41. The method of claim 40, wherein separating at said first base station the combined forward backhaul traffic comprises separating the first and second forward backhaul traffic.

42. The method of claim 41, wherein separating the first and second forward backhaul traffic comprises multiplexing the separated second forward backhaul traffic onto the one or more data channels allocated from the air interface for transmission to the second base station.

43. A radio base station for use in a wireless communication network comprising:
  first transceiver resources to transmit and receive backhaul traffic to and from a second radio base station in the network using one or more channels allocated from a mobile station air interface;
  second transceiver resources to transmit and receive mobile station traffic to and from mobile stations using one or more channels of the air interface not allocated to the backhaul traffic;
  a transceiver processor to process the mobile station traffic transmitted and received by the second transceiver resources; and
  a backhaul processor to process the backhaul traffic transmitted and received by the first transceiver resources.

44. The radio base station of claim 43, wherein the radio base station further comprises a primary antenna coupled to at least the second transceiver resources to transmit and receive mobile station traffic.

45. The radio base station of claim 44, wherein the radio base station further comprises a backhaul module including a secondary antenna and a transmit portion of the first transceiver resources to transmit backhaul traffic to said second base station.

46. The radio base station of claim 45, wherein said first transceiver resources and said second transceiver resources include shared receiver resources.

47. The radio base station of claim 45, wherein said first transceiver resources and said second transceiver resources include shared transmitter resources.

48. The radio base station of claim 45, wherein the secondary antenna is a directional transmit antenna to reduce interference between air interface transmissions from the secondary antenna and air interface transmissions from the primary antenna.

49. The radio base station of claim 44, wherein the radio base station further comprises a backhaul module including a secondary antenna and a receive portion of the first transceiver resources to receive backhaul traffic from said second base station.

50. The radio base station of claim 43, wherein the first and second transceiver resources comprise shared transceiver resources, and wherein the radio base station further comprises a primary antenna used by the shared transceiver resources to transmit and receive both backhaul traffic and mobile station traffic.

51. The radio base station of claim 50, wherein the backhaul processor is coupled to the transceiver processor, which is in turn coupled to the shared transceiver resources, and wherein the backhaul processor generates mobile station traffic for transmission to one or more mobile stations based on processing backhaul traffic received through the primary antenna.

52. The radio base station of claim 50, wherein the backhaul processor generates backhaul traffic for transmission to the second radio base station via the primary antenna based on mobile station traffic received through the primary antenna.

53. The radio base station of claim 43, wherein the radio base station is a parent radio base station and the second radio base station is a child radio base station, and wherein the parent radio base station further comprises a primary backhaul interface communicatively coupling the parent radio base station to a supporting Base Station Controller (BSC).

54. The radio base station of claim 53, wherein the primary backhaul interface receives first backhaul traffic from the BSC destined for mobile stations supported by the parent radio base station and second backhaul traffic destined for the child radio base station and mobile stations supported by the child radio base station.

55. The radio base station of claim 54, wherein the parent radio base station generates mobile station traffic from the first backhaul traffic, generates forward backhaul traffic from the second backhaul traffic, and transmits said second backhaul traffic to the child radio base station via the air interface.

56. The radio base station of claim 55, wherein the second backhaul traffic includes a plurality of mobile station traffic streams and network signaling data, and wherein the parent radio base station generates the forward backhaul traffic by multiplexing the plurality of mobile station traffic streams and the network signaling data onto one or more allocated packet data channels.

57. The radio base station of claim 53, wherein the parent radio base station generates primary backhaul traffic for transmission to the base station controller via the primary backhaul interface by processing mobile station traffic received at the parent base station and by processing reverse backhaul traffic received from the child radio base station.

58. The radio base station of claim 53, wherein the reverse backhaul traffic received by the parent radio base station from the child radio base station comprises multiplexed data streams from a plurality of mobile stations and network signaling data, and wherein the parent radio base station processes the reverse backhaul traffic by demultiplexing the data streams and network signaling data.

59. The radio base station of claim 43, wherein the radio base station allocates one or more packet data channels from the air interface for the backhaul traffic.

60. The radio base station of claim 59, wherein the radio base station comprises a cdma2000 radio base station, and uses one or more supplemental packet data channels (SCH) to carry backhaul traffic.

61. The radio base station of claim 43, wherein the radio base station is a parent radio base station supporting one or more child radio base stations, and wherein the parent radio base station multiplexes mobile station traffic and network signaling data onto the one or more channels allocated from the air interface for transmission to the one or more child radio base stations as forward backhaul traffic.

62. The radio base station of claim 43, wherein the radio base is a child radio base station transferring reverse backhaul traffic to a parent radio base station, and wherein the child radio base station multiplexes mobile station traffic and network signaling data onto the one or more channels allocated from the air interface for transmission to the parent radio base station as reverse backhaul traffic.

63. The radio base station of claim 62, wherein the child radio base station receives reverse backhaul traffic from one or more additional child RBSs and relays that received backhaul traffic as part of the reverse backhaul traffic sent to the parent radio base.

* * * * *

UNITED STATES PATENT AND TRADEMARK OFFICE
CERTIFICATE OF CORRECTION

PATENT NO. : 7,321,571 B2 Page 1 of 1
APPLICATION NO. : 10/256720
DATED : January 22, 2008
INVENTOR(S) : Schnack et al.

It is certified that error appears in the above-identified patent and that said Letters Patent is hereby corrected as shown below:

In Column 14, Line 63, in Claim 31, delete "backhaui" and insert -- backhaul --, therefor.

In Column 15, Line 59, in Claim 38, delete "backhaui" and insert -- backhaul --, therefor.

In Column 16, Line 1, in Claim 40, after "targeted to" delete "the".

In Column 18, Line 34, in Claim 63, delete "radio base." and insert -- radio base station. --, therefor.

Signed and Sealed this

Seventh Day of October, 2008

JON W. DUDAS
*Director of the United States Patent and Trademark Office*